United States Patent
Nagashima et al.

(10) Patent No.: US 11,268,855 B2
(45) Date of Patent: Mar. 8, 2022

(54) WIDEBAND EXTENDED PULSED LIGHT SOURCE, SPECTROMETRY DEVICE, AND SPECTROMETRY METHOD

(71) Applicant: Ushio Denki Kabushiki Kaisha, Tokyo (JP)

(72) Inventors: Toshikazu Nagashima, Tokyo (JP); Takuma Yokoyama, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/282,498

(22) PCT Filed: Sep. 12, 2019

(86) PCT No.: PCT/JP2019/035900
§ 371 (c)(1),
(2) Date: Apr. 2, 2021

(87) PCT Pub. No.: WO2020/075442
PCT Pub. Date: Apr. 16, 2020

(65) Prior Publication Data
US 2021/0356323 A1 Nov. 18, 2021

(30) Foreign Application Priority Data
Oct. 12, 2018 (JP) .............................. JP2018-193890

(51) Int. Cl.
*H01S 3/00* (2006.01)
*H01S 3/067* (2006.01)
(Continued)

(52) U.S. Cl.
CPC ................ *G01J 3/10* (2013.01); *G01J 3/0208* (2013.01); *G01J 3/2803* (2013.01); *G01J 3/42* (2013.01);
(Continued)

(58) Field of Classification Search
CPC .... G01J 3/10; G01J 3/0208; G01J 3/42; G01J 3/2803; H01S 3/0092; H01S 3/06737;
(Continued)

(56) References Cited

U.S. PATENT DOCUMENTS

2004/0136665 A1* 7/2004 Furman .................... G02B 6/04
385/115
2005/0180707 A1 8/2005 Furman et al.
(Continued)

FOREIGN PATENT DOCUMENTS

JP 2002-523808 A 7/2002
JP 2013-205390 A 10/2013

*Primary Examiner* — Xinning (Tom) Niu
(74) *Attorney, Agent, or Firm* — Kenichiro Yoshida

(57) ABSTRACT

[Object] There is provided a wideband extended pulsed light source that maintains uniqueness of an elapsed time with respect to a wavelength and does not collapse the uniqueness of an elapsed time with respect to a wavelength even when an output is increased.
[Solution] Light L1 from a pulsed laser source 11 is converted into supercontinuum light by a nonlinear element 12, is output as wideband pulsed light L2, and is caused to enter a pulse extension element 2. The pulse extension element 2 that is a multi-core fiber performs pulse extension in each of cores 211 and outputs wideband extended pulsed light L3. In the wideband extended pulsed light L3, an elapsed time and a wavelength in a pulse correspond to each other on one-to-one basis, and the wideband extended pulsed light L3 is used as light for spectrometry.

22 Claims, 10 Drawing Sheets

(51) Int. Cl.
*G01J 3/10* (2006.01)
*G02F 1/35* (2006.01)
*G01J 3/02* (2006.01)
*G01J 3/28* (2006.01)
*G01J 3/42* (2006.01)
*G02F 1/365* (2006.01)

(52) U.S. Cl.
CPC ............ *G02F 1/3528* (2021.01); *G02F 1/365* (2013.01); *H01S 3/0057* (2013.01); *H01S 3/0092* (2013.01); *H01S 3/06737* (2013.01)

(58) Field of Classification Search
CPC ...... H01S 3/0057; H01S 3/005; G02F 1/3528; G02F 1/365; G01N 21/359; G02B 6/30; G02B 6/42
See application file for complete search history.

(56) References Cited

U.S. PATENT DOCUMENTS

| | | | |
|---|---|---|---|
| 2007/0086713 A1 | 4/2007 | Ingmar et al. | |
| 2010/0111118 A1* | 5/2010 | Seo | G02B 6/2804 372/6 |
| 2012/0224802 A1* | 9/2012 | Zheng | B41J 2/46 385/14 |
| 2014/0233091 A1* | 8/2014 | Clowes | G02B 27/10 359/341.1 |

* cited by examiner (1)

| INTRA-PULSE TIME | WAVELENGTH | REFERENCE SPECTRUM DATA | MEASURED VALUE | ABSORPTION SPECTRUM |
|---|---|---|---|---|
| $t_1$ | $\lambda_1$ | $V_1$ | $v_1$ | $v_1/V_1$ |
| $t_2$ | $\lambda_2$ | $V_2$ | $v_2$ | $v_2/V_2$ |
| $t_3$ | $\lambda_3$ | $V_3$ | $v_3$ | $v_3/V_3$ |
| . | . | . | . | . |
| . | . | . | . | . |
| . | . | . | . | . |
| $t_{n-2}$ | $\lambda_{n-2}$ | $V_{n-2}$ | $v_{n-2}$ | $v_{n-2}/V_{n-2}$ |
| $t_{n-1}$ | $\lambda_{n-1}$ | $V_{n-1}$ | $v_{n-1}$ | $v_{n-1}/V_{n-1}$ |
| $t_n$ | $\lambda_n$ | $V_n$ | $v_n$ | $v_n/V_n$ |

WIDEBAND EXTENDED PULSED LIGHT SOURCE, SPECTROMETRY DEVICE, AND SPECTROMETRY METHOD

TECHNICAL FIELD

The invention of the present application relates to a wideband pulse source and relates to a device and a method for measuring spectral characteristics of a sample by utilizing wideband pulsed light.

BACKGROUND ART

A pulsed oscillation laser (pulsed laser) is a typical pulsed light source. In recent years, a study of widening of the band of the wavelength of a pulsed laser has been eagerly made, and the study is typically on generation of supercontinuum light (hereinafter, referred to as SC light) by utilizing a nonlinear optical effect. The SC light is light that is obtained by causing light from a pulsed laser source to pass through a nonlinear element, such as a fiber, and widening the band of the wavelength by nonlinear optical effects such as self-phase modulation or optical soliton.

CITATION LIST

Patent Literature

PTL 1: Japanese Laid-open Patent Publication No. 2013-205390

SUMMARY OF INVENTION

Technical Problem

The above-described wideband pulsed light is extended in the wavelength region but is still narrow in the pulse width (time width). It is, however, possible to extend the pulse width as well by utilizing a group delay in a transmission medium, such as an optical fiber. In such a case, it is possible by selecting an element having suitable wavelength dispersion characteristics to perform pulse extension in a state in which an elapsed time and a wavelength in a pulse correspond to each other on a one-to-one basis. Pulsed light in such a state in which an elapsed time and a wavelength in a pulse correspond to each other on a one-to-one basis is also called chirped pulsed light or linear chirped pulsed light.

The correspondence between an elapsed time and a wavelength in thus pulse-extended wideband pulsed light (hereinafter referred to as wideband extended pulsed light) can be effectively utilized in spectrometry. In other words, when wideband extended pulsed light is received by a photodetector, a temporal change in a light intensity detected by the photodetector corresponds to the light intensity of each wavelength, that is, a spectrum. Therefore, a temporal change in output data from the photodetector can be converted into a spectrum, which enables spectrometry without using a special dispersive element, such as a diffraction grating. Accordingly, it is possible to know spectral characteristics (for example, spectral transmittance) of a sample by irradiating the sample with wideband extended pulsed light, causing a photodetector to receive the light from the sample, and measuring a temporal change thereof.

As described above, wideband extended pulsed light is useful in the field of, in particular, spectrometry and the like. However, according to the study conducted by the inventors, it is found that, when output of a wideband pulse source is increased to cause stronger light to be output, an unintended nonlinear optical effect is generated at a pulse extension element and collapses uniqueness (one-to-one correspondence) of an elapsed time with respect to a wavelength.

The invention of the present application is based on this knowledge, and an object of the invention of the present application is to provide a wideband extended pulsed light source that maintains uniqueness of an elapsed time with respect to a wavelength and does not collapse the uniqueness of an elapsed time with respect to a wavelength, even when output is increased.

Solution to Problem

To solve the aforementioned problem, the invention according to claim 1 of the present application includes:
a wideband pulse source that outputs wideband pulsed light; and
a pulse extension element that extends a pulse width of the wideband pulsed light from the wideband pulse source,
in which the pulse extension element is a single-mode multi-core fiber or a single-mode bundle fiber having a plurality of cores and performing pulse extension in each of the cores to cause a relationship between an elapsed time and a wavelength in a pulse to be a one-to-one relationship.

To solve the aforementioned problem, the invention according to claim 2 has a configuration including, in the configuration according to claim 1, a light guiding means that guides wideband light from the wideband pulse source to each of the cores of the pulse extension element.

To solve the aforementioned problem, the invention according to claim 3 has a configuration in which, in the configuration according to claim 2, the light guiding means includes a fan-in device that guides wideband light from the wideband pulse source to each of the cores of the pulse extension element.

To solve the aforementioned problem, the invention according to claim 4 has a configuration including, in the configuration according to any one of claims 1 to 3, a dividing element that divides wideband pulsed light from the one wideband pulse source and causes the wideband pulsed light to enter each of the cores of the pulse extension element.

To solve the aforementioned problem, the invention according to claim 5 has a configuration in which, in the configuration according to claim 4, the dividing element is a microlens array disposed at a location where wideband pulsed light from the wideband pulse source enters, the microlens array including microlenses each optically connected to a corresponding one of the cores of the pulse extension element.

To solve the aforementioned problem, the invention according to claim 6 has a configuration in which, in the configuration according to claim 4, the dividing element is a branch fiber or a PLC splitter disposed at a location where wideband pulsed light from the wideband pulse source enters.

To solve the aforementioned problem, the invention according to claim 7 has a configuration including, in the configuration according to any one of claims 1 to 6, an exit-side optical system that causes wideband pulsed light that exits from each of the cores of the pulse extension element to irradiate an identical irradiation region in a superposed manner.

To solve the aforementioned problem, the invention according to claim 8 has a configuration in which, in the configuration according to any one of claims 1 to 7, the wideband pulse source outputs supercontinuum light.

To solve the aforementioned problem, the invention according to claim 9 has a configuration in which, in the configuration according to claim 8, the wideband pulse source includes a pulsed laser source and a nonlinear element that generates supercontinuum light by causing a nonlinear optical effect to be generated in pulsed laser light from the pulsed laser source and outputs the supercontinuum light as the wideband pulsed light.

To solve the aforementioned problem, the invention according to claim 10 has a configuration in which, in the configuration according to claims 1 to 9, the wideband pulse source is a pulse source that outputs pulsed light over a band of 50 nm or more in a wavelength region of 900 nm or more and 1300 nm or less.

To solve the aforementioned problem, the invention according to claim 11 has a configuration of being a spectrometry device including:

the wideband extended pulsed light source according to any one of claims 1 to 10;

a photodetector disposed at a location where light from a sample irradiated with the wideband extended pulsed light from the wideband extended pulsed light source is received; and an arithmetic means that performs an arithmetic operation that converts a temporal change in output data from the photodetector into spectrum data in accordance with a relationship between a time and a wavelength in a pulse extended by the pulse extension element.

To solve the aforementioned problem, the invention according to claim 12 has a configuration of being a spectrometry method including:

a pulse extension step of causing wideband pulsed light to enter a single-mode multi-core fiber or a single-mode bundle fiber having a plurality of cores, and performing pulse extension in each of the cores to cause a relationship between an elapsed time and a wavelength in a pulse to be a one-to-one relationship;

an irradiation step of irradiating a sample with wideband pulsed light that has been pulse-extended;

a light reception step of receiving light from a sample irradiated with the wideband pulsed light by a photodetector; and an arithmetic step of performing an arithmetic operation that coverts a temporal change in output data from the photodetector into spectrum data in accordance with a relationship between a time and a wavelength in a pulse extended in the pulse extension step.

Advantageous Effects of Invention

As described below, according to the invention described in claim 1 of the present application, it is possible to reduce input power with respect to one core in the pulse extension element, and thus, an unintended nonlinear optical effect is not generated at the pulse extension element, even when output is increased as a whole, and wideband extended pulsed light having flat spectral characteristics is output. In addition, energy efficiency is not decreased, and light having a sufficient intensity can be obtained in a wavelength region that is originally necessary. Furthermore, there is no problem of pulse stability being impaired.

In addition to the aforementioned effect, according to the invention described in claim 2, the light guiding means that guides wideband pulsed light from the wideband pulse source to each of the cores of the pulse extension element is included, and thus, flexibility in the arrangement of the wideband pulse source and the arrangement of the pulse extension element is increased.

In addition to the aforementioned effect, according to the invention described in claim 3, the dividing element that divides wideband pulsed light from the one wideband pulse source, and that causes the wideband pulsed light to enter each of the cores of the pulse extension element is included, and it is thus possible to reduce a loss of light when causing the light to enter the pulse extension element.

In addition to the aforementioned effect, according to the invention described in claim 4, the dividing element is a microlens array, and it is thus possible to further reduce the loss of light when causing the light to enter the pulse extension element.

In addition to the aforementioned effect, according to the invention described in claim 5, the dividing element is a branch fiber or a PLC splitter, and thus, there is a merit in terms of costs.

In addition to the aforementioned effect, according to the invention described in claim 6, the light guiding means includes the fan-in device, and it is thus possible to further reduce the loss of light when causing the light to enter the pulse extension element.

In addition to the aforementioned effect, according to the invention described in claim 7, the exit-side optical system is included, and it is thus easy to irradiate an identical irradiation region with the wideband extended pulsed light in a superposed manner and possible to further utilize the merit of irradiation with high-illuminance wideband extended pulsed light in which generation of an unintended nonlinear optical effect is suppressed.

According to the invention described in claim 8 or 9, the wideband pulse source outputs supercontinuum light, and it is thus easy to perform pulse extension while ensuring the uniqueness of a time with respect to a wavelength.

According to the invention described in claim 10, pulsed light over a band of 50 nm or more is output in a wavelength region of 900 nm or more and 1300 nm or less, and therefore, the wideband extended pulsed light source is suitably usable as a light source for near-infrared spectrometry and is suitable as a light source for spectroscopic analysis of a material.

According to the invention described in claim 11 or 12, it is possible to perform spectrometry by utilizing light in which the uniqueness of a time with respect to a wavelength is highly maintained, and therefore, accuracy in spectrometry is increased. In addition, there is no problem of the SN ratio decreasing in a specific wavelength region due to a dynamic range, and there is also no problem of reproducibility of measurement decreasing due to impaired pulse stability. Furthermore, it is possible to perform irradiation with light with increased energy efficiency, and it is thus also possible to suitably perform spectrometry of a highly absorptive sample.

BRIEF DESCRIPTION OF DRAWINGS

FIG. 5(1) is a schematic front view, and FIG. 5(2) is a schematic side sectional view.

FIG. 10 is a schematic illustration of a configuration of a measurement program included in spectrometry software.

DESCRIPTION OF EMBODIMENTS

Next, embodiments for embodying the invention of the present application will be described.

Figure 1:
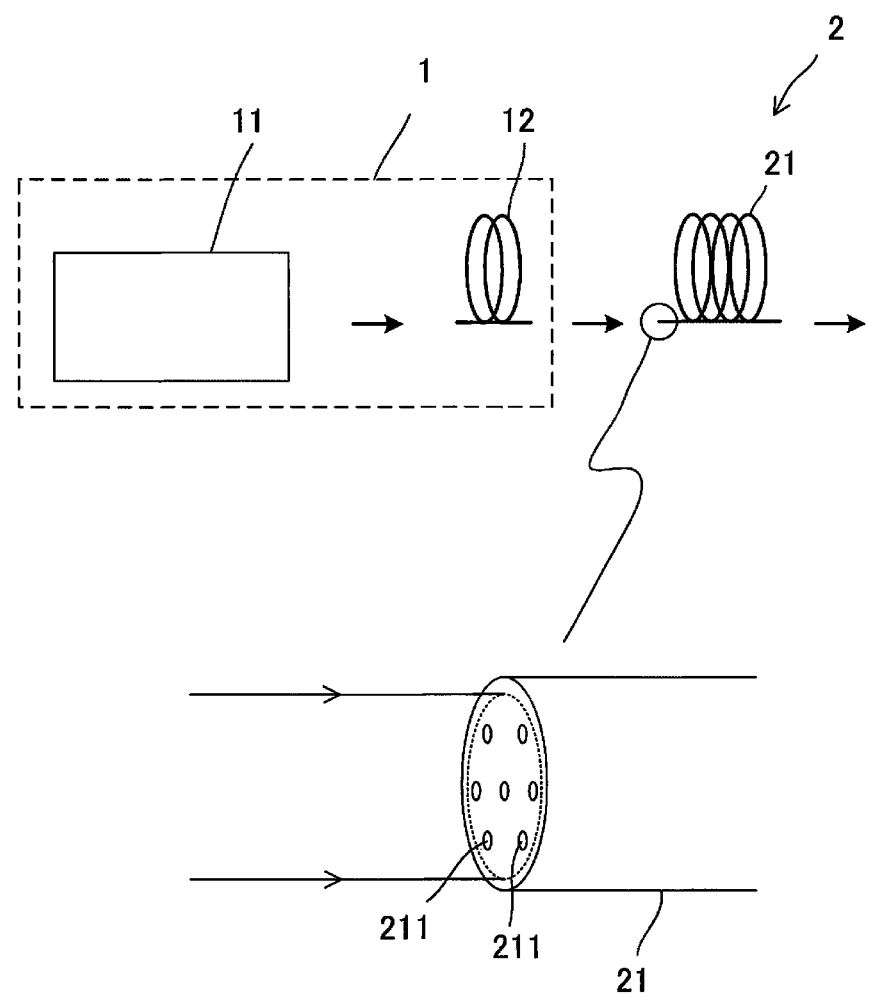
FIG. 1 is a schematic illustration of a wideband extended pulsed light source according to a first embodiment.
Figure 2:
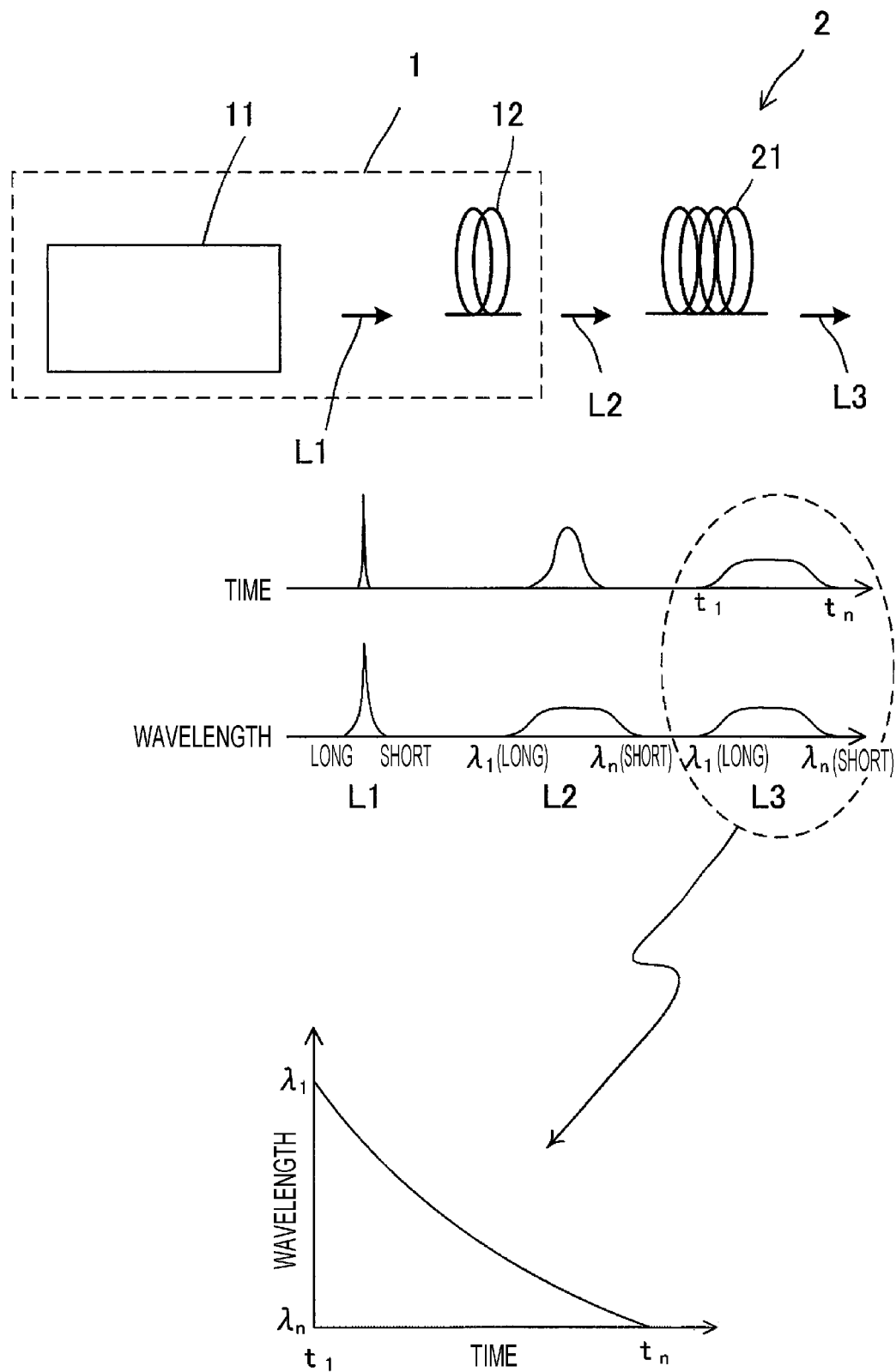
FIG. 2 is a schematic illustration of an operation of the wideband extended pulsed light source in FIG. 1.

First, an embodiment of the invention of a wideband extended pulsed light source will be described. FIG. 1 is a schematic illustration of a wideband extended pulsed light source according to a first embodiment. FIG. 2 is a schematic illustration of an operation of the wideband extended pulsed light source illustrated in FIG. 1. The wideband extended pulsed light source illustrated in FIG. 1 and FIG. 2 includes a wideband pulse source 1 that outputs wideband pulsed light, and a pulse extension element 2 that extends the pulse width of the wideband pulsed light from the wideband pulse source 1.

The wideband pulse source 1 that outputs SC light is used in the present embodiment. Specifically, the wideband pulse source 1 includes a pulsed laser source 11 and a nonlinear element 12 that light from the pulsed laser source 11 enters.

As the pulsed laser source 11, various type of pulsed laser sources are usable, and, for example, a gain switch laser, a microchip laser, a fiber laser, and the like are usable. Since SC light is generated by a nonlinear optical effect, the pulsed laser source 11 is preferably a super-short pulsed laser source.

A fiber is generally used as the nonlinear element 12. For example, a photonic crystal fiber and other nonlinear fibers are usable as the nonlinear element 12.

SC light output from the wideband pulse source 1 constituted by the pulsed laser source 11 and the nonlinear element 12 is light whose band is widened in a desired band in accordance with an intended use. For example, when light is to be used in near-infrared spectroscopic analysis, as described later, the light is preferably light of a wavelength band of about 900 to 1300 nm. Note that "wideband" means that light is continuous over a wavelength range of 50 nm or more.

A multi-core fiber 21 of a single mode is used as the pulse extension element 2 in the present embodiment. The number of cores 211 may be about two to seven and can be more. The multi-core fiber 21 of a suitable material, such as a quartz-based material and a fluorine-based material, is selectable in accordance with the wavelength band.

The pulse extension element 2 is an element that extends a pulse width by wavelength dispersion (group velocity dispersion depending on a wavelength). Wavelength dispersion includes zero dispersion, normal dispersion, and abnormal dispersion. It is preferable to use the pulse extension element 2 that has characteristics of not causing zero dispersion in the entire wavelength band of wideband pulsed light that enters the pulse extension element 2. That is, it is preferable to cause normal dispersion or abnormal dispersion in the entire wavelength band.

As illustrated in FIG. 2, the pulsed laser source 11 oscillates pulsed laser light L1. The pulsed laser light L1 enters the nonlinear element 12 and exits as SC light L2 due to generation of a nonlinear optical effect. The SC light L2 then enters the multi-core fiber 21 serving as the pulse extension element 2, is pulse-extended in the process of propagating through the multi-core fiber 21, and is output as wideband extended pulsed light L3.

As illustrated in FIG. 2, in such an operation, the wideband extended pulsed light becomes the pulse-extended light in a state in which uniqueness of a wavelength with respect to a time is ensured. That is, in the present example, long-wavelength light is present in the initial stage of a pulse, and shorter-wavelength light is present as a lapse of time. Therefore, when time is indicated on the horizontal axis and wavelength is indicated on the vertical axis, the relationship between the time and the wavelength is substantially inversely proportional, as illustrated in FIG. 2. Although the relationship may be reverse when the pulse is extended differently, the time uniquely corresponds to the wavelength in any way. Thus, when a light intensity is obtained with a time specified, the light intensity indicates the light intensity (spectrum) of a wavelength corresponding to the time.

Note that the pulsed laser source 11 generally has characteristics of first oscillating, although in a narrow wavelength band, long-wavelength-side light and oscillating shorter-wavelength-side light as a lapse of time in one pulse. As illustrated in FIG. 2, this relationship is generally maintained even when light becomes SC light L2 as a result of the band thereof being extended by the nonlinear element 12, and the light is generally light that has characteristics of including long-wavelength-side light in the initial stage of a pulse and including shorter-wavelength-side light as a lapse of time. Therefore, normal dispersion is more preferable than abnormal dispersion as the dispersion characteristics of the pulse extension element 2 to favorably maintain the uniqueness of a time with respect to a wavelength after pulse extension. This is because, in the case of normal dispersion, the shorter the wavelength of shorter-wavelength-side light, the further the shorter-wavelength-side light delays in propagating, and it is thus possible to perform pulse extension while maintaining the relationship between the wavelength and the time in wideband pulsed light.

It is, however, possible even in the case of abnormal dispersion to perform pulse extension in a state in which the uniqueness of a time with respect to a wavelength is ensured, by increasing the length of the multi-core fiber 21. In the case of a multi-core fiber having abnormal dispersion characteristics, the relationship becomes a relationship in which short-wavelength light is present at the initial stage of a pulse after pulse extension and longer-wavelength-side light is present as a lapse of time. Note that normal dispersion has an advantage of, for example, being able to reduce a loss since the length of the multi-core fiber 21 is not required to be long.

A feature of using the multi-core fiber 21 as the pulse extension element 2 in the wideband extended pulsed light source according to the embodiment is based on a result of study conducted by the inventors regarding an increase in output of wideband extended pulsed light. Hereinafter, the feature will be described.

In the present embodiment, a fiber is used as the pulse extension element 2. A loss is unavoidable even when any elements are used. In particular, when a fiber is used, it is required to increase the length of the fiber to increase the amount of extension, and the increase in the length of the fiber increases a loss by an amount of the increased length.

Therefore, it is required to compensate for a loss in the pulse extension element 2 to increase output of the wideband extended pulsed light. A first conceivable method for this is increasing the power of wideband pulsed light input to the pulse extension element 2. Based on such an idea, the inventors conducted an experiment in which the power of wideband pulsed light input to the pulse extension element 2 was increased. As a result, it has been found that, when the power of the input wideband pulsed light becomes larger than a certain limit, the wavelength characteristics of wideband extended pulsed light that is output becomes nonuniform suddenly, and the spectrum (the intensity distribution with the wavelength on the horizontal axis) becomes in a largely undulating state.

When input power is gradually increased, the output is also increased little by little at first in response to the increase. However, when the increase exceeds a certain limit, such nonuniformity suddenly occurs. It is thus presumed that this event is caused by an unintended nonlinear optical effect being generated at the pulse extension element 2. This is also supported by a fact that light of a certain degree of an intensity is present in a wavelength region that has not been substantially present with a small input power.

When the spectral characteristics of the wideband extended pulsed light are largely undulating characteristics, the characteristics may be a great problem in some intended uses. For example, when the wideband extended pulsed light is used in spectrometry such as that described below, the SN ratio of a wavelength region in which light is weak is extremely degraded due to a dynamic range of a wavelength, and measurement may be substantially impossible in the wavelength region. The characteristics also can be a problem when irradiation with light of flat spectral distribution is required for a reason such as checking optical characteristics of a material.

In addition, when light is generated in a wavelength region that is originally unnecessary due to an unintended nonlinear optical effect, input power is used for the generation, and energy efficiency is thus decreased. It is consequently impossible to obtain light having a sufficient intensity in a wavelength region that is originally necessary.

Furthermore, according to the study conducted by the inventors, it has been also found that there is a problem that pulse stability is impaired when wideband pulsed light is caused to enter a fiber serving as the pulse extension element 2 with large power. The pulse stability here is stability in which spectral characteristics and an output intensity are constant between pulses. Events in which spectral characteristics of some pulses change and in which output varies while input is constant are confirmed when wideband pulsed light is caused to enter a fiber serving as the pulse extension element 2 with large power.

Considering such problems, the multi-core fiber 21 is employed as the pulse extension element 2 in the embodiment. That is, the multi-core fiber 21 is employed to reduce input power per core, thereby forming a structure in which an unintended nonlinear optical effect is not generated at the pulse extension element 2, even when wideband extended pulsed light source has high output as a whole.

In this sense, it is sufficient for the multi-core fiber 21 to have two cores. Practically, the number of cores may be about two to seven or can be eight or more.

As described above, according to the wideband extended pulsed light source of the embodiment, the multi-core fiber 21 is used as the pulse extension element 2, and therefore, even when wideband extended pulsed light source has high output as a whole, wideband extended pulsed light having flat spectral characteristics is output without an unintended nonlinear optical effect being generated at the pulse extension element 2. In addition, energy efficiency is not decreased, and light having a sufficient intensity can be obtained in a wavelength region that is originally necessary. Furthermore, there is no problem of pulse stability being impaired. Due to such advantages, the wideband extended pulsed light source of the embodiment is suitable as a light source for spectrometry and other intended uses.

Figure 3:
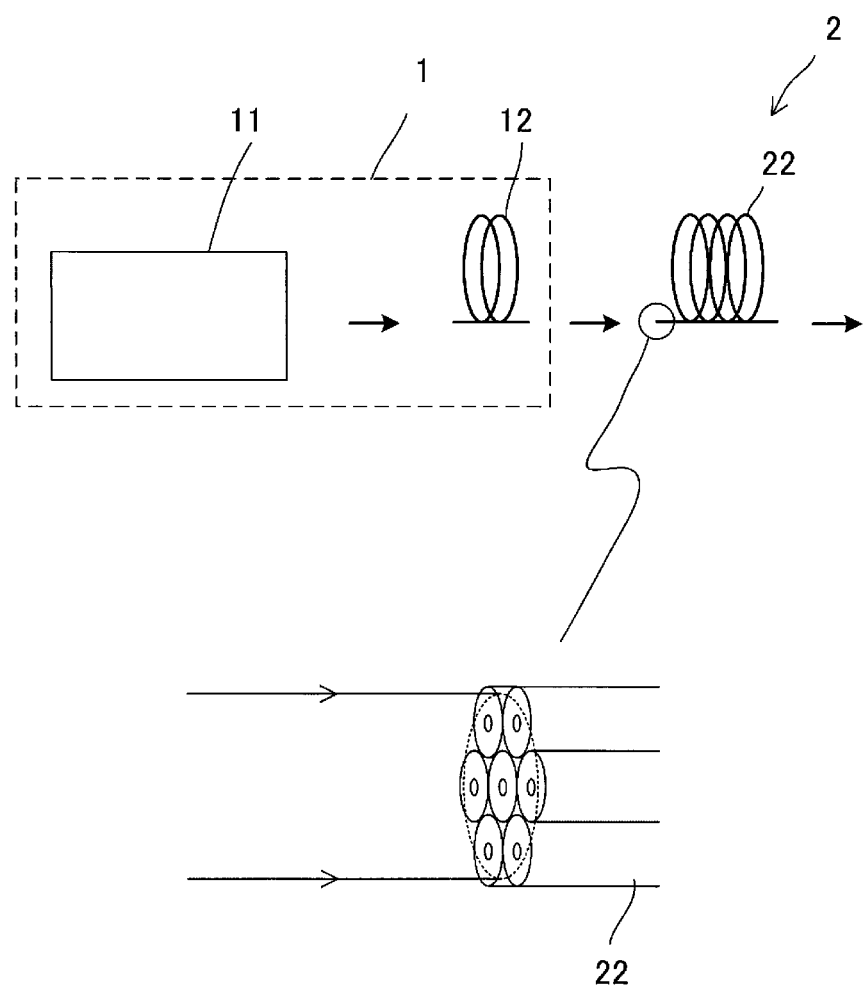
FIG. 3 is a schematic illustration of a wideband extended pulsed light source according to a second embodiment.

Next, a wideband extended pulsed light source according to a second embodiment will be described. FIG. 3 is a schematic illustration of a wideband extended pulsed light source according to a second embodiment.

As illustrated in FIG. 3, a bundle fiber 22 is used as the pulse extension element 2 in the second embodiment. The other configurations are the same as those in the first embodiment.

The bundle fiber 22 that has a structure in which a plurality of single-mode fibers are bundled is employed. Although a bundle fiber in which only two fibers are bundled is theoretically effective, a bundle fiber in which about two to seven fibers are bundled is usable. The material thereof can be a quartz-based material, a fluorine-based material, or the like. A material with which a loss is small in a wavelength band of wideband pulsed light is suitably used. In addition to bonding, melting (fusion bonding) may be employed as a bundling method.

Also in the second embodiment, light from the pulsed laser source 11 is caused to become SC light (wideband pulsed light) by the nonlinear element 12 and input to the bundle fiber 22 serving as the pulse extension element 2. The SC light is then output after pulse extension is performed by wavelength dispersion in the process of propagating each core of the bundle fiber 22.

The SC light from the wideband pulse source 1 is then divided to enter the cores of the bundle fiber 22 and pulse-extended, and therefore, energy per core is reduced. Therefore, an unintended nonlinear optical effect is not generated, which avoids uniqueness of a time with respect to a wavelength from collapsing, efficiency from decreasing due to light generation in an unnecessary wavelength region, and pulse stability from being impaired.

In comparison with the first embodiment, there is an advantage in terms of costs since the bundle fiber is available at lower costs than the multi-core fiber. The multi-core fiber, however, can be structurally compact compared with the bundle fiber and has a merit of not being as bulky as the bundle fiber when being looped. Moreover, a loss (the amount of light that does not enter the cores) at an entrance end surface is also generally smaller in the multi-core fiber than in the bundle fiber, and the multi-core fiber is thus also excellent in terms of efficiency.

Figure 4:
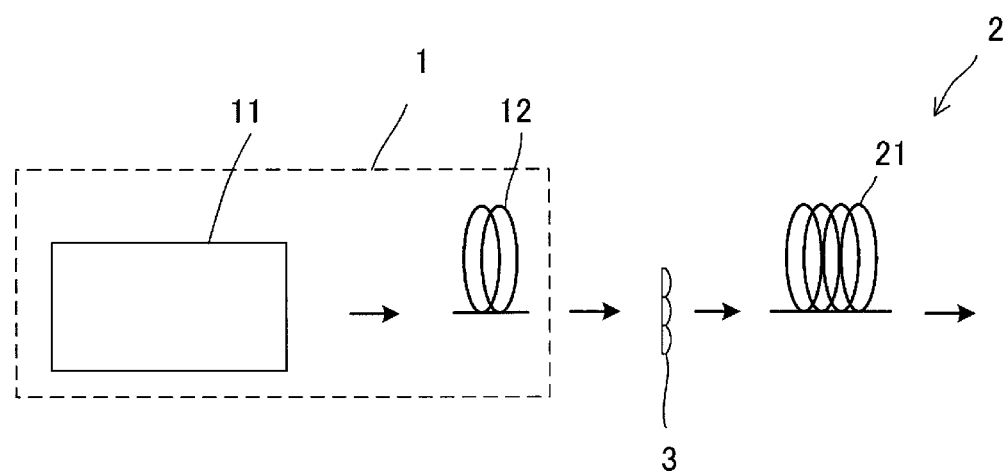
FIG. 4 is a schematic illustration of a wideband extended pulsed light source according to a third embodiment.

Next, a wideband extended pulsed light source according to a third embodiment will be described. FIG. 4 is a schematic illustration of a wideband extended pulsed light source according to a third embodiment.

The wideband extended pulsed light source according to the third embodiment includes a light guiding means that guides wideband pulsed light from the wideband pulse source 1 to each of cores of the pulse extension element 2, and a dividing element that divides the wideband pulsed light from the wideband pulse source and causes the wideband pulsed light to enter each of the cores. A microlens array 3 is employed as both the light guiding means and the dividing element in the present embodiment.

Figure 5:
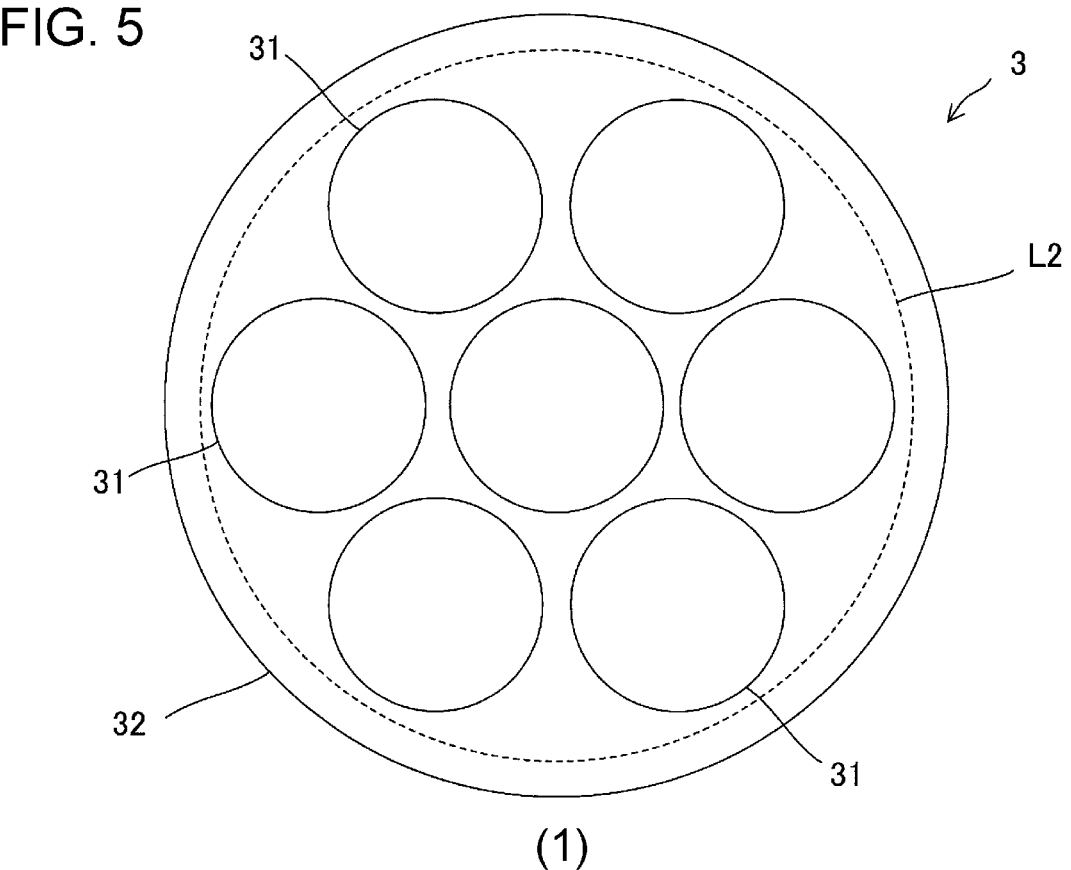
FIG. 5 is a schematic illustration of a microlens array used in the third embodiment.
Figure 5:
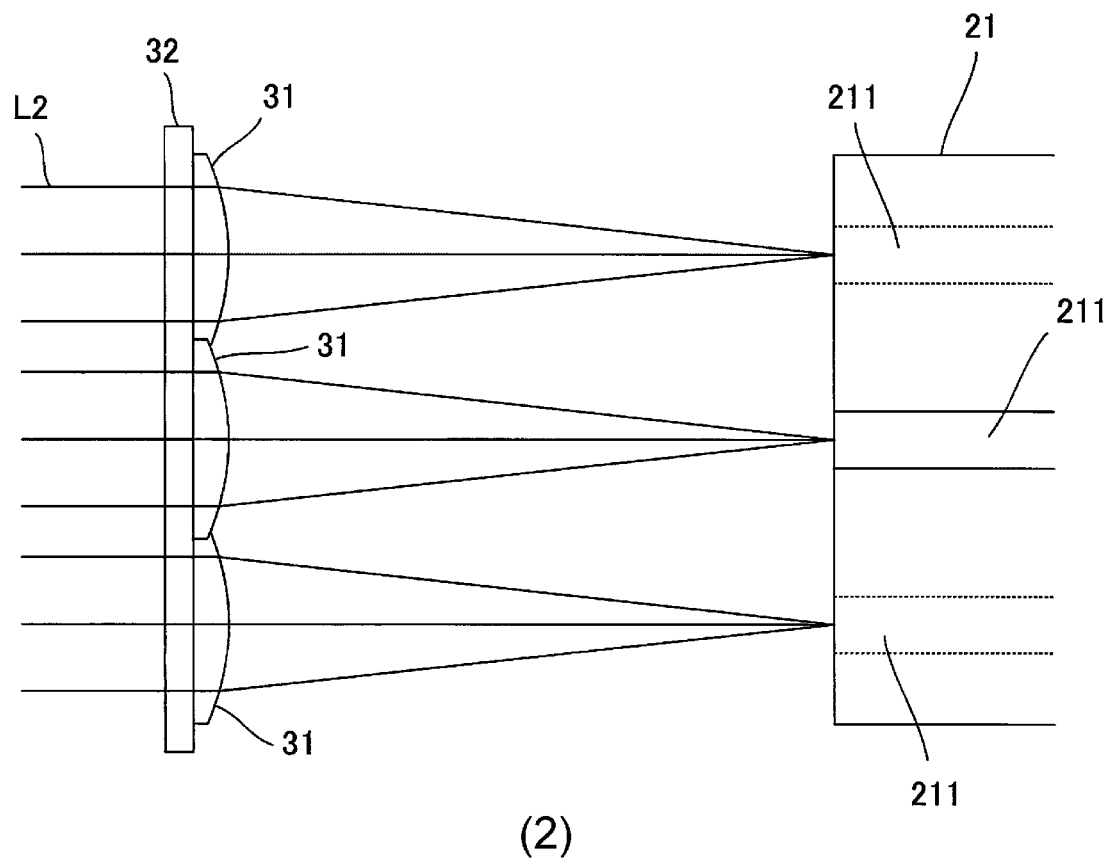

FIG. 5 is a schematic illustration of a microlens array used in the third embodiment. FIG. 5(1) is a schematic front view, and FIG. 5(2) is a schematic side sectional view.

As illustrated in FIG. 5(1), the microlens array 3 is an optical element in which a plurality of microlenses 31 are arrayed. The multi-core fiber 21 is used as the pulse extension element 2 in the present embodiment. The number and the arrayed positions of the microlenses 31 coincide with the number and the arranged positions of the cores 211 in the multi-core fiber 21, respectively. The microlenses 31 are formed on a transparent plate 32. The microlenses 31 are bonded to the transparent plate 32 or are formed integrally therewith by a method such as cutting, molding, or the like.

The microlenses 31 are each optically coupled to a corresponding one of the cores 211 of the multi-core fiber 21. That is, the microlenses 31 are disposed such that light that has exited from each of the microlenses 31 reaches the corresponding one of the cores. Each of the microlenses 31 is a condenser lens in the present embodiment to condense and cause wideband pulsed light L2 to enter the cores 211. The beam diameter of the wideband pulsed light L2 output from the wideband pulse source 1 is slightly smaller than the size of the entirety of the microlens array 3. In FIG. 5(1), the beam diameter of the wideband pulsed light L2 is indicated by a broken line. The beam of the wideband pulsed light L2 is divided by the microlens array 3. The divided beams are condensed by the microlenses 31 corresponding thereto and guided to enter respective cores 211.

Also in the present embodiment, since the wideband pulsed light L2 is divided to enter the cores 211 and pulse-extended, an unintended nonlinear optical effect is not generated, which avoids uniqueness of a time with respect to a wavelength from collapsing, efficiency from decreasing due to light generation in an unnecessary wavelength region, and pulse stability from being impaired. The microlens array 3 is employed as the light guiding means and the dividing element in the present embodiment, and a loss of light when the light is caused to enter the pulse extension element 2 is thus reduced. That is, as illustrated in FIG. 5(1), the loss of wideband pulsed light is only generated in a gap part between the microlenses 31, and the loss of light is small compared with the multi-core fiber 21 and the bundle fiber 22.

Figure 6:
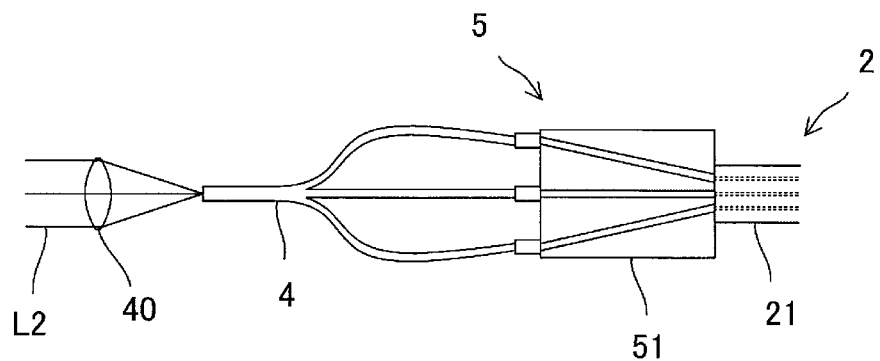
FIG. 6 is a schematic illustration of a main part of a wideband extended pulsed light source according to a fourth embodiment.

Next, a wideband extended pulsed light source according to a fourth embodiment will be described. FIG. 6 is a schematic illustration of a main part of a wideband extended pulsed light source according to the fourth embodiment.

The wideband extended pulsed light source according to the fourth embodiment employs a branch fiber 4 to be used as both the light guiding means and the dividing element. The term "branch fiber" in the present description is a generic name of a fiber having a branch structure such as an optical fiber coupler.

The entrance side of the branch fiber 4 is a single-core fiber, and the exit side thereof branches into a plurality of fibers. The multi-core fiber 21 is also used as the pulse extension element 2 in the present embodiment, and the number of branches of the branch fiber 4 is equal to the number of the cores of the multi-core fiber 21. However, there may not be an issue even when the number of the cores of the multi-core fiber 21 is larger than the number of the branches of the branch fiber 4 with some unused cores.

A fan-in device 5 is provided for connection between the branch fiber 4 and the multi-core fiber 21 in the present embodiment. As the fan-in device 5, a planar optical waveguide-type fan-in device (hereinafter referred to as the planar optical waveguide-type Fi) 51 is employed in the present embodiment. That is, in the present embodiment, the branching exit-side end portions of the branch fiber 4 are arranged on the same plane, and the planar optical waveguide-type Fi 51 is connected to the end portions. The planar optical waveguide-type Fi 51 that has a structure in which waveguides are formed on a substrate with a glass material such as quartz or a high polymer material such as PMMA can be employed. A coupling element may be disposed between the planar optical waveguide-type Fi 51 and the multi-core fiber 21. The coupling element is an element that couples the waveguides arranged on a plane of the planar optical waveguide-type Fi 51 to the cores arranged two-dimensionally on the entrance end surface of the multi-core fiber 21.

Also in the fourth embodiment, since the wideband pulsed light is divided to enter the cores and pulse-extended, an unintended nonlinear optical effect is not generated, which avoids uniqueness of a time with respect to a wavelength from collapsing, efficiency from decreasing due to light generation in an unnecessary wavelength region, and pulse stability from being impaired. The branch fiber 4 is employed as the light guiding means and the dividing element in the present embodiment, and a loss of light when the light is caused to enter the pulse extension element 2 is thus reduced.

As illustrated in FIG. 6, it is preferable, since the loss is further reduced, to dispose a condenser lens 40 on an optical path before the branch fiber 4 and cause the wideband pulsed light to enter the branch fiber 4 after being condensed.

Alternatively, a PLC splitter (optical waveguide splitter) is also usable instead of the branch fiber 4. The branch fiber 4 and the PLC splitter for communication can be used, and there is a merit in terms of costs.

Figure 7:
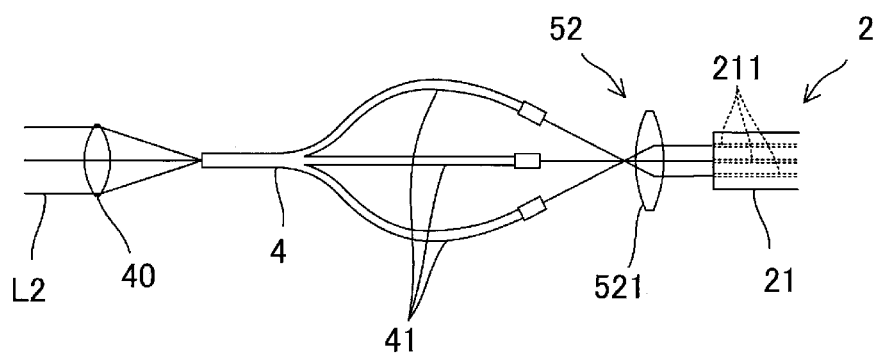
FIG. 7 is a schematic illustration of a modification of the fourth embodiment.

FIG. 7 is a schematic illustration of a modification of the fourth embodiment. In the example illustrated in FIG. 7, a spatial optical-type fan-in device (hereinafter referred to as the spatial optical-type Fi) 52 is used for connection between the branch fiber 4 and the multi-core fiber 21. In the spatial optical-type Fi 52, fibers (the exit side of the branch fiber 4) 41 and the cores of the multi-core fiber 21 are spatially optically connected by a lens 521. That is, the wideband pulsed light that exits from the fibers 41 is condensed by the lens 521 and enters the cores 211 corresponding thereto. In FIG. 7, the fibers 41 and the cores 211 are connected by one lens 521 but can be connected by a plurality of lenses similarly to the microlens array.

Alternatively, as the fan-in device for connecting the branch fiber 4 and the multi-core fiber 21, a fiber bundle-type fan-in device, a melt drawing-type fan-in device, or the like can be employed. When a fiber bundle-type fan-in device is to be used, the modification has a structure in which the exit-side fibers of the branch fiber 4 each have a small diameter and in which the cores of the multi-core fiber 21 are connected thereto with a refractive index bonding resin interposed therebetween. With a melt drawing-type fan-in device, the modification has a structure in which the exit-side fibers of the branch fiber 4 are bundled together, melt-drawn, and connected to the multi-core fiber 21 so as to have the same core arrangement as the multi-core fiber 21.

In each of the embodiments in which the aforementioned branch fiber 4 is used, it is also possible to use a bundle fiber instead of the multi-core fiber 21 as the pulse extension element 2. In this case, the exit-side fibers of the branch fiber 4 and fibers of the bundle fiber are connected with a connector. In some cases, the exit-side fibers of the branch fiber 4 may be extended as they are to be used as a bundle fiber serving as the pulse extension element 2.

The fan-in devices in the above-described examples can be used not only together with the branch fiber 4 but also independently or together with a different element. For example, the structure can be a structure in which fibers provided as the input side of the fan-in device are bundled together and in which light from the wideband pulse source 1 is simply caused to enter the bundled fibers. In addition, the structure also can be a structure in which wideband pulsed light is caused to enter bundled input-side fibers of the fan-in device through an optical element such as the microlens array 3.

Figure 8:
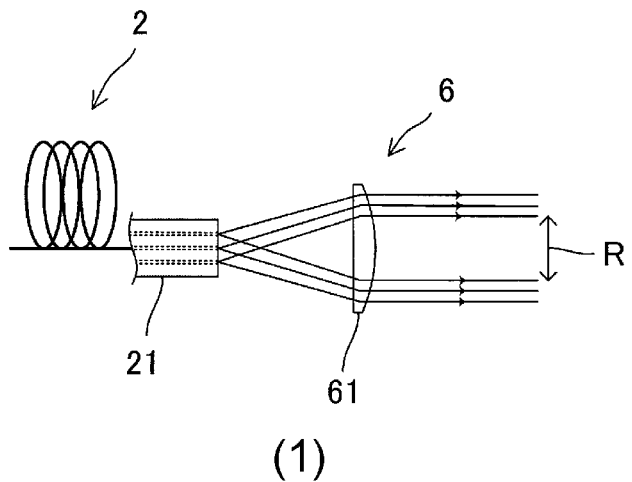
FIG. 8 is a schematic illustration of a configuration provided on an optical path of exiting wideband extended pulsed light.
Figure 8:
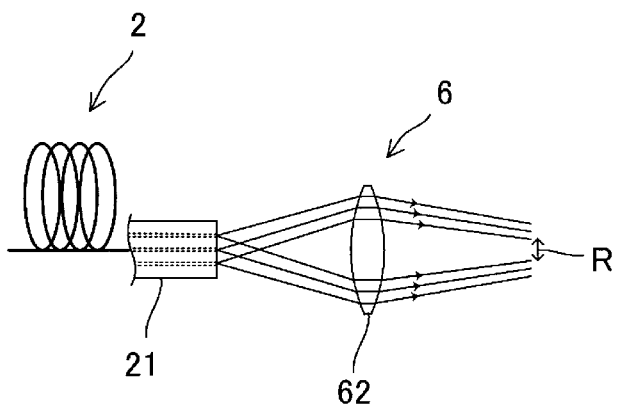
Figure 8:
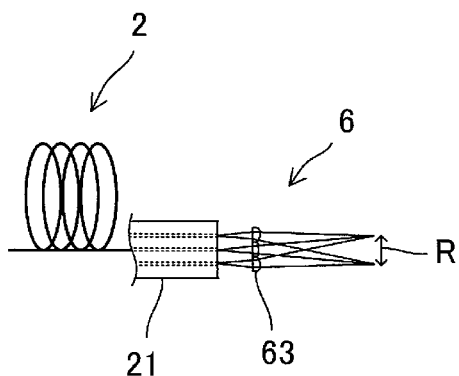

In the aforementioned embodiments, which each have a feature regarding the configuration of causing wideband pulsed light to enter the pulse extension element 2, the configuration provided on the optical path of exiting wideband extended pulsed light can be also optimized. Hereinafter, this point will be described with reference to FIG. 8. FIG. 8 is a schematic illustration of a configuration provided on the optical path of exiting wideband extended pulsed light.

As described above, the wideband extended pulsed light source of each embodiment performs pulse extension by a plurality of the cores disposed in parallel and thus can reduce energy per core. This configuration becomes more beneficial when wideband extended pulsed light that exits from each core irradiates an identical irradiation region in a superposed manner. That is, one high-output wideband pulse source 1 is employed, and light is superposed when irradiation is finally performed while the light is divided in pulse extension at an intermediate point. Therefore, it is possible to, while suppressing generation of unintended nonlinear optical effect, perform irradiation with high-illuminance wideband extended pulsed light in which the high-output wideband pulse source 1 is employed.

In order to cause wideband extended pulsed light to irradiate an identical irradiation region in a superposed manner, the exit end of a fiber (the multi-core fiber 21 or the bundle fiber 22) used as the pulse extension element 2 is simply disposed close to the irradiation region. However, there are a case in which an irradiation distance of a certain degree is intended to be obtained and a case in which it is structurally impossible to dispose the exit end close to an irradiation region. In such cases, it is preferable to dispose an exit-side optical system 6 that causes wideband extended pulsed light to irradiate an identical irradiation region in a superposed manner.

As an example of the exit-side optical system 6, it is possible to employ a configuration in which, as illustrated in FIG. 8(1), a collimator lens 61 that causes wideband extended pulsed light that has exited from each core of the pulse extension element 2 to become parallel light and irradiate an irradiation region R is disposed or a configuration in which, as illustrated in FIG. 8(2), a condenser lens 62 that condenses light and causes the light to irradiate the irradiation region R is disposed. It is also possible to employ a configuration in which, as illustrated in FIG. 8(3), a microlens array 63 is employed as the exit-side optical system 6 and in which irradiation patterns formed by microlenses are caused not to be displaced from each other and to coincide with the irradiation region R.

When such an exit-side optical system 6 is disposed, it becomes possible to irradiate the irradiation region R of an appropriate size with wideband extended pulsed light in a superposed manner and to irradiate the irradiation region R with wideband extended pulsed light in a superposed manner at an appropriate irradiation distance. It is thus possible to further utilize a merit of irradiation with high-illuminance wideband extended pulsed light in which generation of an unintended nonlinear optical effect is suppressed.

In each of the aforementioned embodiments, the wideband pulse source 1 outputs SC light as wideband pulsed light. The wideband pulse source 1, however, may output wideband pulsed light that is not SC light. For example, a light source that is not a SC light source but outputs wideband light with short pulses may be used as the wideband pulse source 1, and the pulses may be extended.

SC light is, however, preferable in that pulse extension is easily performed by the pulse extension element 2 with the uniqueness of a time with respect to a wavelength ensured since SC light still has characteristics of a laser. When a SC light source is used as the wideband pulse source 1, an element other than a fiber can be used as the nonlinear element 12.

In each of the aforementioned embodiments, the light guiding means disposed on the optical path before the pulse extension element 2 is also used as the dividing element. The light guiding means, however, may be a means that simply performs light guiding only. For example, the configuration may be a configuration in which light is guided by an optical system using a mirror and caused to enter the multi-core fiber 21 or the bundle fiber 22 serving as the pulse extension element 2. A lens that changes a beam diameter may be disposed in the optical system. In any case, provision of the light guiding means increases flexibility in the arrangement of the wideband pulse source and the arrangement of the pulse extension element.

As an alternative to a case in which wideband pulsed light from one wideband pulse source 1 is divided and caused to enter the cores, a plurality of the wideband pulse sources 1 can be provided. For example, the same number of the wideband pulse sources 1 as the number of the cores of the pulse extension element 2 may be provided to cause respective output light to enter the cores, or a plurality of the wideband pulse sources 1 less than the number of the cores may be provided to divide output light, as appropriate, and cause the output light to enter the cores.

In each of the aforementioned embodiments, when the light source is configured, regarding the wavelength band, such that extended pulsed light over a band of 50 nm or more is output in a wavelength region of 900 nm or more and 1300 nm or less, the light source can be suitably used for near-infrared spectrometry, such as that described later, and is suitable as a light source for spectroscopic analysis of a material. A wavelength band can be selected by selecting the pulsed laser source 11 having an appropriate wavelength as a center wavelength and selecting the nonlinear element 12 that widens the band to an appropriate wavelength band.

Figure 9:
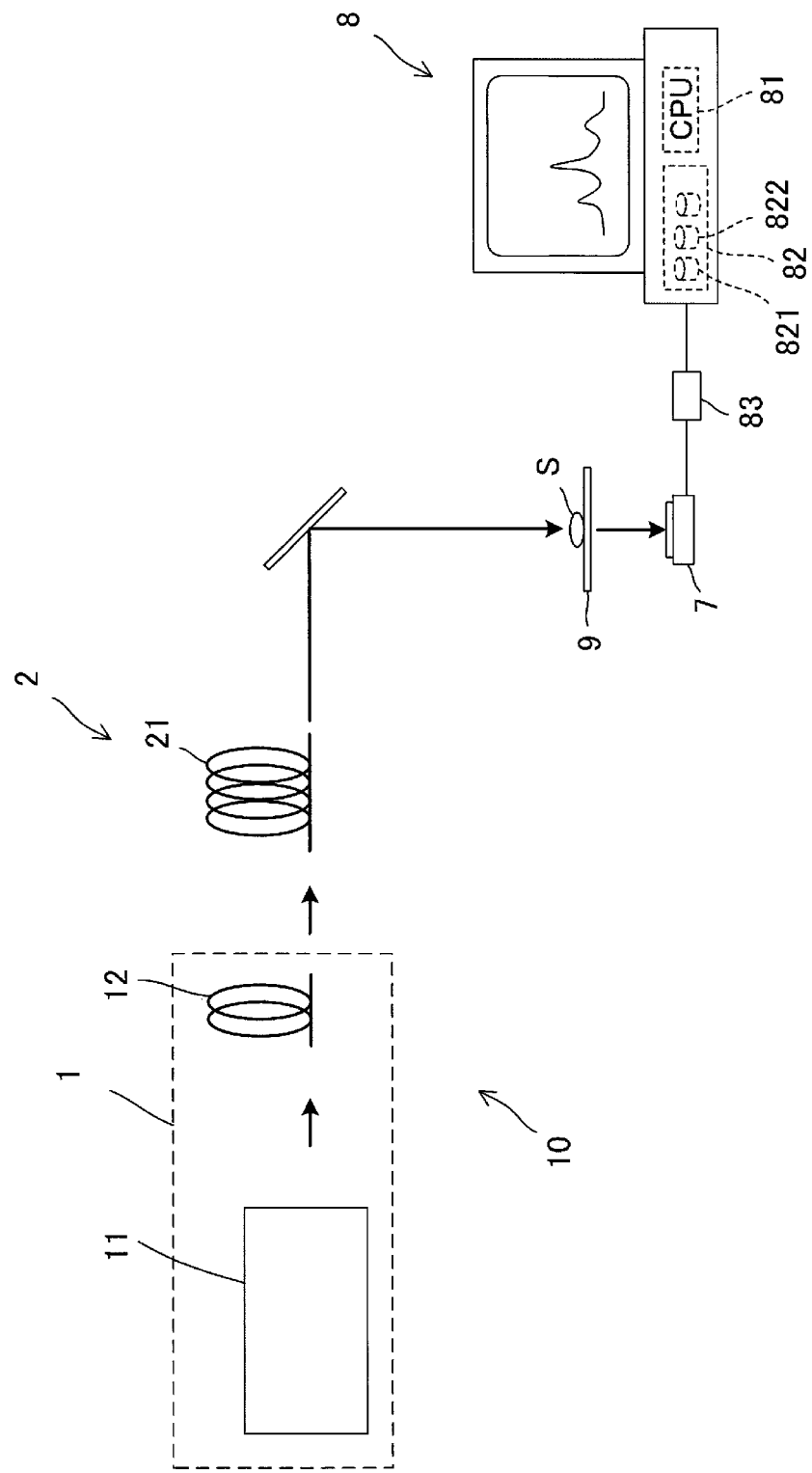
FIG. 9 is a schematic illustration of a spectrometry device of an embodiment.

Next, embodiments of the invention of a spectrometry device and a spectrometry method will be described. FIG. 9 is a schematic illustration of a spectrometry device according to an embodiment.

The spectrometry device illustrated in FIG. 9 includes a wideband extended pulsed light source 10, a photodetector 7 disposed at a location where light from a sample S irradiated with wideband extended pulsed light from the wideband extended pulsed light source 10 is to be detected, and an arithmetic means 8 that processes an output from the photodetector 7.

As the wideband extended pulsed light source 10, any one of those in the above-described embodiments is used. In the present embodiment, spectrometry of transmitted light transmitted through the sample S is presupposed, and the sample S is thus disposed on a transparent placement plate 9. Since the measurement wavelength band is a near-infrared region of about 900 to 1300 nm, the placement plate 9 of a material having a favorable transmittance in this band is used.

The photodetector 7 is disposed on the light exit side of the placement plate 9. A photodiode is used as the photodetector 7. A high-speed photodiode of about 1 to 10 GHz is suitably usable.

As the arithmetic means 8, a general-purpose PC including a processor 81 and a storage 82 is usable. Spectrometry software is installed in the storage 82, and the software includes a measurement program 821 including a code that converts a temporal change in an output from the photodetector 7 into a spectrum, reference spectrum data 822 for use in a calculation of a spectrum, and the like. An AD converter 83 is provided between the photodetector 7 and the general-purpose PC, and an output of the photodetector 7 is converted by the AD converter 83 into digital data that is input to the general-purpose PC.

FIG. 10 is a schematic illustration of a configuration of the measurement program included in the spectrometry software. The example in FIG. 10 is an example of a configuration for measuring an absorption spectrum (spectral absorption rate). The reference spectrum data 822 is a value for each wavelength that serves as a reference for calculating the absorption spectrum. The reference spectrum data 822 is obtained by causing light from the wideband extended pulsed light source 10 to enter the photodetector 7 without passing through a sample. That is, light is caused to directly enter the photodetector 7 without passing through a sample, an output of the photodetector 7 is input to the general-purpose PC via the AD converter 83, and a value for each temporal resolution Δt is obtained. Each value is stored ($V_1$, $V_2$, $V_3$, . . . ) as a reference intensity at a time ($t_1$, $t_2$, $t_3$, . . . ; hereinafter referred to as intra-pulse time) for each Δt in a pulse.

The reference intensities $V_1$, $V_2$, $V_3$, . . . at the intra-pulse times $t_1$, $t_2$, $t_3$, . . . are intensities (spectra) of corresponding wavelengths $\lambda_1$, $\lambda_2$, $\lambda_3$, . . . . The relationship between the intra-pulse times $t_1$, $t_2$, $t_3$, . . . and wavelengths is previously examined, and the values $V_1$, $V_2$, $V_3$, . . . at the intra-pulse times are treated as the values of $\lambda_1$, $\lambda_2$, $\lambda_3$, . . . , respectively.

When light that has passed through a sample is caused to enter the photodetector 7, outputs from the photodetector 7 are similarly stored ($v_1$, $v_2$, $v_3$, . . . ) as values (measured values) at the intra-pulse times $t_1$, $t_2$, $t_3$, . . . via the AD converter 83. The measured values are compared ($v_1/V_1$, $v_2/V_2$, $v_3/V_3$, . . . ) with the reference spectrum data 822, and results thereof are absorption spectrums (strictly, values obtained by dividing from 100%).

The measurement program 821 is programmed to perform the aforementioned arithmetic processing. Note that, actually, the ratio of components of a sample may be analyzed or a sample may be identified by examining an absorption spectrum, although the absorption spectrum is merely examined in the example in FIG. 10.

According to such a spectrometry device or a spectrometry method, the wideband extended pulsed light source 10 in any one of the aforementioned embodiments is used as a light source, and it is thus possible to perform spectrometry with light in which uniqueness of a time with respect to a wavelength is highly maintained. Therefore, accuracy in spectrometry is increased. In addition, there are no problem of the SN ratio decreasing in a specific wavelength region due to a dynamic range and no problem of reproducibility of measurement decreasing due to impaired pulse stability. Furthermore, since it is possible to perform irradiation with light with increased energy efficiency, there is a merit of being able to measure a highly absorptive sample by increasing the transmitted-light intensity. Note that although spectrometry of transmitted light is presented as an example in the aforementioned description, it is also possible to perform spectrometry of reflected light with the photodetector 7 provided at a location where the reflected light is received. Even in this case, the same effect can be obtained.

The wideband extended pulsed light source is also applicable to microscope technology, such as a nonlinear optical microscope, in addition to the above-described spectrometry.

In addition to a light source that emits SC light, an ASE (amplified spontaneous emission) light source, an SLD (super-luminescent diode) light source, and the like can be employed as the wideband pulse source 1. The ASE light source is light that is generated in a fiber and thus is highly compatible with the pulse extension element 2, which is a fiber element. The ASE light can cause wideband pulsed light to enter the pulse extension element 2 with low loss and can constitute a high-efficiency wideband extended pulsed light source. The SLD light source also can cause light to enter the wideband pulse extension element 2 with low loss since light generated in a narrow active layer is extracted, and can constitute a high-efficiency wideband extended pulsed light source.

REFERENCE SIGNS LIST 1 wideband pulse source
2 pulse extension element
21 multi-core fiber
22 bundle fiber
3 microlens array
31 microlens
4 branch fiber
40 condenser lens
5 fan-in device
51 optical waveguide-type Fi
52 spatial optical-type Fi
6 exit-side optical system
61 collimator lens
62 condenser lens
63 microlens array
7 photodetector
8 arithmetic means
9 placement plate
10 wideband extended pulsed light source

The invention claimed is:

1. A wideband extended pulsed light source comprising:
a wideband pulse source that outputs wideband pulsed light; and
a pulse extension element that extends a pulse width of the wideband pulsed light from the wideband pulse source,
wherein the pulse extension element includes a single-mode multi-core fiber and a single-mode bundle fiber having a plurality of cores and performs pulse extension based upon wavelength dispersion characteristics in each of the cores to cause a relationship between an elapsed time and a wavelength in a pulse to be a one-to-one relationship.

2. The wideband extended pulsed light source according to claim 1, further comprising a light guiding means that guides wideband light from the wideband pulse source to each of the cores of the pulse extension element.

3. The wideband extended pulsed light source according to claim 2, wherein the light guiding means includes a fan-in device that guides wideband light from the wideband pulse source to each of the cores of the pulse extension element.

4. The wideband extended pulsed light source according to claim 1, further comprising a dividing element that divides wideband pulsed light from the one wideband pulse source and causes the wideband pulsed light to enter each of the cores of the pulse extension element.

5. The wideband extended pulsed light source according to claim 4, wherein the dividing element is a microlens array disposed at a location where wideband pulsed light from the wideband pulse source enters, the microlens array including microlenses each optically connected to a corresponding one of the cores of the pulse extension element.

6. The wideband pulsed extended light source according to claim 4, wherein the dividing element is a branch fiber or a PLC splitter disposed at a location where wideband pulsed light from the wideband pulse source enters.

7. The wideband extended pulsed light source according to claim 1, further comprising an exit-side optical system that causes wideband pulsed light that exits from each of the cores of the pulse extension element to irradiate an identical irradiation region in a superposed manner.

8. The wideband extended pulsed light source according to claim 1, wherein the wideband pulse source outputs supercontinuum light.

9. The wideband extended pulsed light source according to claim 8, wherein the wideband pulse source includes a pulsed laser source and a nonlinear element that generates supercontinuum light by causing a nonlinear optical effect to be generated in pulsed laser light from the pulsed laser source and outputs the supercontinuum light as the wideband pulsed light.

10. The wideband extended pulsed light source according to claim 1, wherein the wideband pulse source is a pulse source that outputs pulsed light over a band of 50 nm or more in a wavelength region of 900 nm or more and 1300 nm or less.

11. A spectrometry device comprising:
a wideband pulse source that outputs wideband pulsed light;
a pulse extension element that extends a pulse width of the wideband pulsed light from the wideband pulse source to generate a wideband extended pulsed light,
wherein the pulse extension element includes a single-mode multi-core fiber and a single-mode bundle fiber having a plurality of cores and performing pulse extension in each of the cores to cause a relationship between an elapsed time and a wavelength in a pulse to be a one-to-one relationship;
a photodetector disposed at a location where light from a sample irradiated with the wideband extended pulsed light from the wideband pulsed light source is received; and
an arithmetic means that performs an arithmetic operation that converts a temporal change in output data from the photodetector into spectrum data in accordance with a relationship between a time and a wavelength in a pulse extended by the pulse extension element.

12. A spectrometry method comprising:
a pulse extension step of causing wideband pulsed light to enter a single-mode multi-core fiber or a single-mode bundle fiber having a plurality of cores, and performing pulse extension in each of the cores to cause a relationship between an elapsed time and a wavelength in a pulse to be a one-to-one relationship;
an irradiation step of irradiating a sample with wideband pulsed light that has been pulse-extended;
a light reception step of receiving light from a sample irradiated with the wideband pulsed light by a photodetector; and
an arithmetic step of performing an arithmetic operation that coverts a temporal change in output data from the photodetector into spectrum data in accordance with a relationship between a time and a wavelength in a pulse extended in the pulse extension step.

13. The wideband extended pulsed light source according to claim 2, further comprising a dividing element that divides wideband pulsed light from the one wideband pulse source and causes the wideband pulsed light to enter each of the cores of the pulse extension element.

14. The wideband extended pulsed light source according to claim 3, further comprising a dividing element that divides wideband pulsed light from the one wideband pulse source and causes the wideband pulsed light to enter each of the cores of the pulse extension element.

15. The wideband extended pulsed light source according to claim 2, further comprising an exit-side optical system that causes wideband pulsed light that exits from each of the cores of the pulse extension element to irradiate an identical irradiation region in a superposed manner.

16. The wideband extended pulsed light source according to claim 3, further comprising an exit-side optical system that causes wideband pulsed light that exits from each of the cores of the pulse extension element to irradiate an identical irradiation region in a superposed manner.

17. The wideband extended pulsed light source according to claim 2, wherein the wideband pulse source outputs supercontinuum light.

18. The wideband extended pulsed light source according to claim 3, wherein the wideband pulse source outputs supercontinuum light.

19. The wideband extended pulsed light source according to claim 2, wherein the wideband pulse source is a pulse source that outputs pulsed light over a band of 50 nm or more in a wavelength region of 900 nm or more and 1300 nm or less.

20. The wideband extended pulsed light source according to claim 3, wherein the wideband pulse source is a pulse source that outputs pulsed light over a band of 50 nm or more in a wavelength region of 900 nm or more and 1300 nm or less.

21. The spectrometry device according to claim 11, further comprising a light guiding means that guides wideband light from the wideband pulse source to each of the cores of the pulse extension element.

22. The spectrometry device according to claim 21, wherein the light guiding means includes a fan-in device that guides wideband light from the wideband pulse source to each of the cores of the pulse extension element.

* * * * *